Patented May 15, 1934

1,959,164

UNITED STATES PATENT OFFICE 1,959,164

CANDLE

Alphons O. Jaeger, Mount Lebanon, Pa., assignor to The Selden Company, Pittsburgh, Pa., a corporation of Delaware No Drawing. Application August 27, 1931, Serial No. 559,774. Renewed August 17, 1933

12 Claims. (Cl. 87—21)

This invention relates to improvements in candles, and has for an object the production of an improved class of candles having certain desirable characteristics.

Objects of the invention are to produce a candle having better burning qualities with a complete utilization of the combustible material and with consequent avoidance of the undesirable and unsightly drip that frequently occurs when candles are burned. A further object is to produce a candle that will be tougher and less liable to damage from shipment.

Candles in use at present consist of a body of vaporizable and combustible material such as wax, stearin, paraffin, or mixtures of stearin and paraffin or tallow, hardened to a central wick and designed to be vaporized and burned when the wick is lighted. During this burning any draft of air or deviation of the candle from the perpendicular results in an uneven melting of the candle material and consequent dripping of the melted material down the sides of the candle, thus producing a considerable loss of the unburned material as well as an unsightly appearance. Moreover since the material of the candle must melt readily in order to give good illumination, a low melting material must be used which often tends to get out of shape in warm weather and increases the above difficulties when burning is attempted. In some cases, for example with large and expensive wax altar candles, a layer of harder wax on the outside has been provided in order to provide toughness, but this expedient can only be applied to expensive candles for special purposes.

The present invention overcomes the above and other difficulties by providing a layer of modified or unmodified resinous material on the external surface of the candle which can be applied by means of dipping, spraying or otherwise and which is so inexpensive as to be applicable to the cheapest grades of candles without appreciably increasing the cost thereof. By suitable choice of the resinous material a coating may be obtained in this manner which is hard and yet will melt as the candle burns, and since it is composed of organic material and is therefore combustible without ash, no deposit or shell is left after continuous burning of the candle. Moreover, such resinous materials are tough and have considerable elasticity which prevents damage to the candles in shipping and makes it unnecessary to provide special shipping containers.

The resinous material to be applied may be of any desired kind, and the use of any known or preferred class of natural or synthetic resins is included in the present invention. Such substances as the polyhydric alcohol organic acid resins, and particularly the glycerol-phthalic anhydride resins as well as phenolaldehyde, phenol-furfural and urea resins, nitrocellulose resins, natural resins such as shellac, copal, dammar and the like, or mixtures of these are especially useful and present the added advantage of low initial cost and solubility in cheap solvents. While in many cases unmodified resins such as the above may be suitable, a closer adjustment of the desired properties to the requirements of the particular candle to be coated may be obtained by the use of modified resins. For example, the polyhydric alcohol polybasic acid resins may be modified by the incorporation during their preparation of monobasic acids such as benzoic, abietic, lactic, salicylic, fat acids, etc. as well as balsams, rosin, and other components of the modified glyptal resins sold on the market as "Rezyls". Other modifying agents may be used, the phthalides such as, for example, those described in my co-pending applications Serial No. 551,798 filed July 18, 1931 and Serial No. 552,075 filed July 20, 1931 being well suited for use in the present invention.

Similarly, an excellent class of coating materials can be obtained by combinations of the various classes of resins, either modified or unmodified. As a result of such mixtures the various outstanding physical properties of the different resins are combined, for example the stability, softness and non-inflammability of the polyhydric alcohol polybasic acids serve to modify the brittle, hard, highly inflammable nitrocellulose resins to produce a coating material which will burn in the presence of the candle flame but will not support combustion independently and which will produce a sufficiently hard and flexible coating to protect the candle during shipping and use. Similarly, the hard, dense and non-inflammable phenolaldehyde resins may be combined with the nitrocellulose resins, with or without the addition of glyptal resins.

A further modification of the coating by incorporation of plasticizers or softeners is also of value. Almost any of the usual softening agents for resinous compositions may be used for this purpose, high boiling esters, e. g. phthalic esters such as diethyl phthalate, phthalides, esters of keto aromatic acids and the like being particularly useful. A special method for the preparation of such soft coatings may also be used for purposes of the present invention, this method consisting of the incorporation of wax, stearin, paraffin, tallow, mixtures of these or other candle material into the resin in order to produce a coating material having sufficient hardness to serve its purpose but which also resembles the material of the candle itself.

The present invention is also of advantage in the preparation of colored candles such as those used for ornamental purposes. Many of the above mentioned resins have distinctive colors and many of them are well adapted for the incorporation of dyes such as perylene dicarboxylic acid diimides, anthracene colors such as alizarin, azo colors, benzanthrone colors, etc. as well as other coloring material, either within the resins themselves or in the plasticizers with which they are associated. For example, the phthalides which may be used in the preparation of polyhydric alcohol-polybasic acid resins or which may be associated with them as plasticizers are solvents for many dyes such as alizarin, dibenzanthrone, etc. and thus permit the application of colors in a neutral medium. Many of the materials used in the preparation of the candle itself, for example, stearin, have a decided bleaching action on the dyes commonly used and tend to fade colors dissolved in them and consequently the use of colored coatings represents a decided advantage in the preparation of such candles.

As has been stated, the resinous coating may be applied by dipping the finished candles into suitable solutions of the prepared resin or into the resins themselves in molten state, or a solution of the resin in such solvents as acetone, toluol, high or low boiling esters, e. g. amyl or butyl acetate, ethyl acetate, etc. may be sprayed over the surface of the finished candle.

The invention is not limited to the use of any definite resin or mixture of resins, since it will be apparent that the type and melting point of the coating will be to a certain extent dependent upon the size of the candle and upon the material from which it is made. For the cheaper and smaller candles, in which the coating will be comparatively close to the candle flame, cheaper resins of comparatively high melting points may be used while with the larger candles a resin of lower melting point and more closely regulated properties will preferably be employed. In all cases, however, the present invention will provide a candle having much better burning qualities since there is no tendency for the molten candle material to escape down the sides of the candle and a larger pool of melted material will be maintained at the base of the wick.

The invention will be further illustrated by the following examples which are for illustrative purposes only and to which it is not limited.

*Example 1*

A modified glyptal resin is prepared by heating a mixture of 202 parts phthalic anhydride, 40.5 parts phthalide and 92 parts glycerin for 2–3 hours at 180° C. or until the desired degree of esterification has been reached. The product, dissolved in suitable solvents, is coated onto ordinary stearin or "tallow" candles of approximately 1¼ inches diameter by dipping or by painting with a brush or stick, and allowed to harden. The treated candles have a hard, glistening surface and do not feel greasy under the fingers. They burn easily and without drip, and show no tendency to stick together when packed together in a warm place.

The proportion of phthalide to phthalic anhydride may be varied in order to vary the hardness of the resinous coating. Thus, for example, a slightly softer resin is produced by using 60.5 parts of phthalide and 191 parts phthalic anhydride in the above preparation, and still greater plasticity is obtained by using 82 parts phthalide, 180 parts phthalic anhydride to 92 parts glycerin.

Corresponding amounts of other modifying agents may also be used, such as benzoic acid, cottonseed oil and other fat acids, etc. By this means, resinous coatings of any desired degree of hardness may be obtained.

*Example 2*

A mixture of 90 parts by weight of glycerin, 195 parts phthalic anhydride and 18–24 parts rosin are heated to 170–185° C. until reaction ceases and a clear product is obtained. The resin so obtained is dissolved in acetone, amyl acetate or an alcohol and 50–75 parts nitrocellulose, cellulose acetate or cellulose ether are stirred in. The solution is thinned to the proper consistency, preferably using benzol, toluol or other cheap solvent, and is applied to wax or stearin candles by dipping, spraying or other coating methods. The coating, after drying in air, is hard and brilliant and produces a candle having a good appearance and excellent burning qualities.

The coating composition may be further plasticized by the addition of suitable amounts of high boiling esters, such as diethyl or dibutyl phthalate, or phthalide, substituted phthalides or hydrogenated phthalides may be used. Esters of keto aromatic acids, such as the methyl, ethyl or propyl esters of benzoyl benzoic or naphthoyl benzoic acid may also be used as plasticizers.

*Example 3*

Beautiful color effects may be obtained by the incorporation of dyes or other coloring materials in the resinous coatings, either as such or in the form of a color lake:

A coating composition is prepared as in previous examples and dissolved in a suitable solvent or mixture of solvents. Amounts up to 1–3% of an aluminum, iron, chromium, nickel or cobalt salt of a keto aromatic acid, e. g. aluminum benzoyl benzoate or zinc naphthoyl benzoate are added. A solution of a suitable lake-forming dye is then prepared, such as a solution of alizarin or other anthraquinone dye in alcohol, and is stirred into the solution containing the coating composition. An intense coloration is thus produced, consisting of a color lake in fine suspension throughout the solvent and giving a brilliant coating when applied to candles of any type by spraying, brushing or dipping. Such colored coatings are particularly useful in the manufacture of ornamental wax candles and the like.

A wide range of dyes may be applied in this manner, any lake-forming dye being suitable that is soluble in an organic solvent compatible with the coating to be applied. Further details of the process of preparing such color lakes are described in the co-pending application of Daniels & Jaeger, Serial No. 503,855, filed December 20, 1930, and any of the lake colors there described may be used with success in the present invention.

*Example 4*

A phenol-formaldehyde condensation product is prepared, for example, by heating the components in the ratio of 1 mol formaldehyde to about 2 mols phenol, with or without the use of accelerators, until the product separates into layers. The resinous layer is collected and dried and dissolved in amyl acetate, acetone, fusel oil or mixtures of these, with or without the addition of benzol, toluol, or other cheap hydrocarbon solvents. 6-8% diethyl or dibutyl phthalate are added as plasticizer and the composition is applied to a candle in the usual manner. After drying and hardening a glistening black coating is produced, which adheres well and serves to protect the candle against damage during shipment and to produce a better candle flame.

If desired, cellulose plastics such as nitro-cellulose, cellulose acetate, cellulose ethers, etc. may be dissolved in the solvent in amounts up to 25-50% of the phenol-formaldehyde resin.

What is claimed as new is:

1. A candle comprising a candle body and an outer coating containing a major portion of a synthetic resin.

2. A candle comprising a candle body and an outer coating containing a major portion of a colored synthetic resin.

3. A candle comprising a candle body and an outer coating containing a polyhydric alcohol-organic acid resin.

4. A candle comprising a candle body and an outer coating containing a polyhydric alcohol—polybasic acid resin.

5. A candle comprising a candle body and an outer coating containing at least one polyhydric alcohol—polybasic acid—monobasic acid resin.

6. A candle comprising a candle body and an outer coating containing at least one glycerol-phthalic anhydride resin.

7. A candle comprising a candle body and an outer coating containing at least one glycerol-phthalic anhydride-monobasic acid resin.

8. A candle comprising a candle body and an outer coating containing a plasticized glycerol phthalate resin.

9. A candle comprising a candle body and an outer coating containing a major portion of a plastic included in the group consisting of cellulose esters, cellulose ethers.

10. A candle comprising a candle body and an outer coating containing at least one polyhydric alcohol—organic acid resin together with at least one cellulose plastic.

11. A candle comprising a candle body and an outer coating containing a major portion of a synthetic resin, said coating being sufficiently thin to be destroyed as the candle burns.

12. A candle comprising a candle body and an outer coating containing a phenol-aldehyde resin, the coating being sufficiently thin to be destroyed as the candle burns.

ALPHONS O. JAEGER.